UNITED STATES PATENT OFFICE.

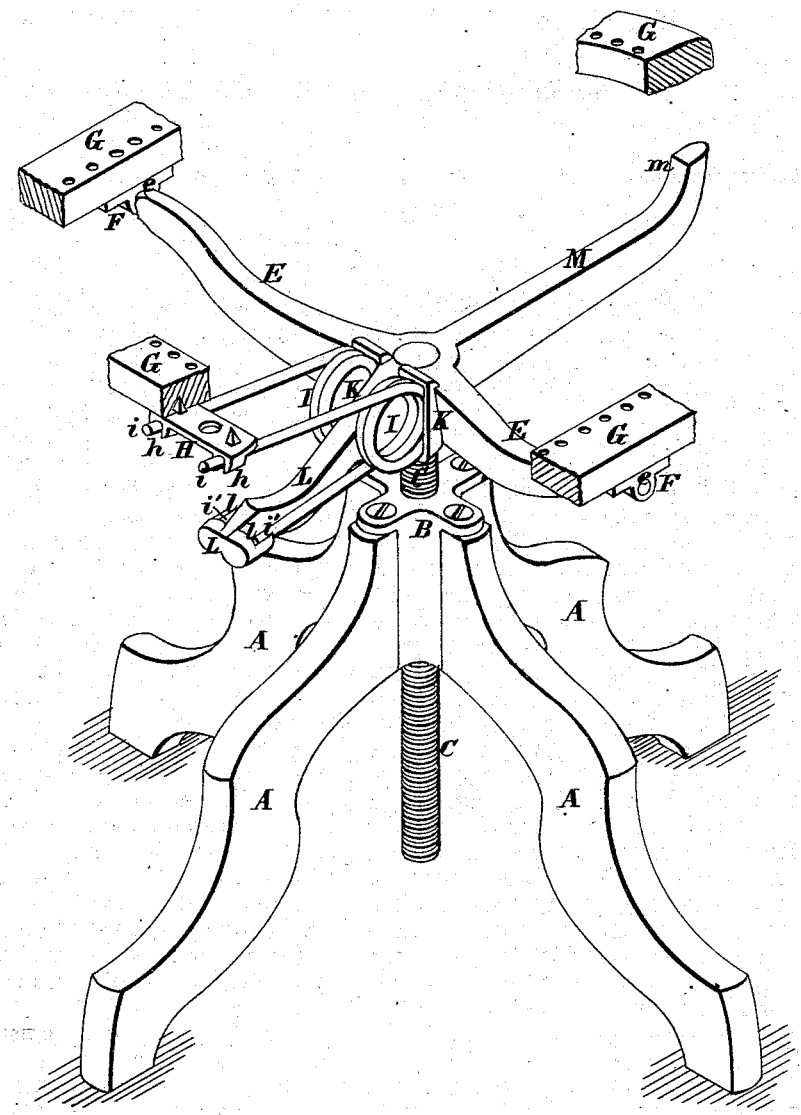

SEBASTIAN HOFFMAN, OF ST. LOUIS, MISSOURI.

IMPROVEMENT IN TILTING CHAIRS.

Specification forming part of Letters Patent No. 158,492, dated January 5, 1875; application filed September 22, 1874.

*To all whom it may concern:*

Be it known that I, SEBASTIAN HOFFMAN, of St. Louis, St. Louis county, Missouri, have invented a certain new and useful Improvement in Tilting Chairs, of which the following is a specification:

My improvement consists in supporting the chair-seat upon pivots at the ends of arms extending from the head of the usual screw, (by which the seat is adjusted vertically,) the back of the seat having attached to it a bearing-plate for the ends of springs, whose other ends rest in recesses of an arm extending backward from the head of the main screw aforesaid. These springs have a general V form, with a coiled part at the angle which rests in a recess of the head casting or spider. The arrangement is such that the springs are placed and held in position without any fitting in the castings, and without any holding-screw, rivet, or other similar device, and so may be readily removed or renewed at any time. An arm extends forwardly from the screw-head, and its end has bearing in a recessed plate attached beneath the front of the seat. This is to serve as a stop to hold the seat in a horizontal position against the efforts of the springs to tilt it farther forward. This connection between the fore arm and the seat also acts as a bearing in turning the seat to change its elevation.

The construction is cheap, as the castings need no finishing, but may all be attached to the screw and chair-bottom as they leave the cleaner, and the springs may be sprung into place without any fitting.

The drawing is a perspective view of my improvement.

A A, &c., are the legs; B, the cast-iron nut to which their upper ends are connected; and C the adjusting or main screw, to which the spider is attached. The spider varies from that in general use. It has two side arms, E E, having at the ends pivots $e$ $e$, which have pivot-bearing in bracket-plates F F attached to the bottom of the seat G. On these pivots the seat tilts backward and forward. The back part of the seat G has attached to its under side a metallic plate, H, having bearings $h$, in which slide the ends $i$ of the springs I. These springs have each a coiled central portion which rests in the recess K of the spider casting, and the lower end $i'$ of each spring is held in a recess, $l$, at the end of the rear arm, L, of the spider. The recesses $l\ l$ are closed at the ends, so that the ends $i'\ i'$ of the springs are prevented from outward end movement. The end $m$ of the front arm, M, of the spider receives the impact of the front of the seat-frame as the seat reaches its horizontal position.

As the chair-seat is tilted backward there is a tendency in both ends of the springs I to slide outward, but as the lower ends are held in the recesses $l\ l$ so as to prevent this movement in the lower ends $i'$, the whole sliding movement takes place in the upper end $i$. The lower ends are thus made to hold the whole spring against sliding out backward, and the recesses K, by the bearing of the coils upon their sides, hold the springs against side movement.

A single spring may be used in place of the two springs shown.

I claim herein as new and of my invention—

In combination with the tilting chair-seat G and supporting spider E E L, the springs I, whose coils and lower ends are held, respectively, in recesses K and $l$, and whose upper ends have bearing against the lower side of the seat-frame, substantially as described.

SEBASTIAN HOFFMAN.

Witnesses:
SAML. KNIGHT,
ROBERT BURNS.